(12) United States Patent
Nagasato (10) Patent No.: US 6,259,665 B1
(45) Date of Patent: Jul. 10, 2001

(54) TILT DETECTOR FOR OPTICAL DISK RECORDING/REPRODUCING APPARATUS

(75) Inventor: Makoto Nagasato, Kanagawa-ken (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/186,443

(22) Filed: Nov. 5, 1998

(30) Foreign Application Priority Data

Nov. 5, 1997 (JP) .................................................. 9-302373

(51) Int. Cl.[7] ............................................................. G11B 3/90

(52) U.S. Cl. ...................................... 369/53.19; 369/44.32

(58) Field of Search ............................ 369/44.32, 44.23, 369/44.35, 44.37, 112, 119, 120, 47.49, 53.14, 53.13, 53.19, 112.01

(56) References Cited

U.S. PATENT DOCUMENTS

| | | | | |
|---|---|---|---|---|
| 5,206,848 | * | 4/1993 | Kusano et al. | 369/44.32 X |
| 5,216,649 | * | 6/1993 | Koike et al. | 369/44.32 X |
| 5,596,557 | | 1/1997 | Matsumoto | 369/44.32 |
| 5,978,332 | * | 11/1999 | Itakura et al. | 369/44.32 |

FOREIGN PATENT DOCUMENTS 7-262585   10/1995   (JP) .
7-272300   10/1995   (JP) .

* cited by examiner

Primary Examiner—Paul W. Huber
(74) Attorney, Agent, or Firm—Foley & Lardner (57) ABSTRACT

An optical recording/reproducing apparatus for recording/reproducing information onto/from an optical recording medium includes an optical element for condensing a light beam onto the recording medium. A detector coupled to the optical element detects a tilt condition between the recording medium and the optical element. The detector irradiates a detection beam onto the recording medium through the optical element, and detects the detection beam reflected by the recording medium through the optical element.

33 Claims, 7 Drawing Sheets

TILT DETECTOR FOR OPTICAL DISK RECORDING/REPRODUCING APPARATUS

BACKGROUND OF THE INVENTION

1. Field of the Invention

The present invention relates to an optical disk recording/reproducing apparatus for recording and/or reproducing an information signal onto/from an optical information recording medium such as an optical disk and more particularly to an optical disk recording/reproducing apparatus with a tilt sensor for detecting a tilt between the optical information recording medium and an objective lens.

2. Description of the Related Art

In recent years, the demand for high density recording to handle a high precision still picture, a video and the like, by an optical information recording medium such as an optical disk and digital versatile disk (DVD) has increased in the information recording and reproducing field. To enable such high precision recording, an optical disk recording/reproducing apparatus capable of realizing a large capacity recording is desired.

Examples of methods to achieve this requirement, include selecting a laser source with a shorter wavelength equipped with an optical pickup unit, and reducing a diameter of a beam spot by increasing the numerical aperture (NA) of the objective lens.

However, if the beam spot diameter is reduced or when the disk track pitch is increased in density, the interference of information signal between a track presently accessed and the adjacent tracks increases, that is, the "crosstalk", or an interference between adjacent signals in the same track increases. These interferences are generated due to a relative tilt between an optical axis of the objective lens of the optical pickup unit and the optical information recording medium (hereinafter referred to as "tilt"). As a result, accurate recording and reproducing of an information signal with respect to the optical information recording medium can not be obtained.

The relationship between an allowance value θ relative to the tilt, a laser wavelength λ and a numerical aperture NA is expressed as follows:

$$\theta \lambda/(NA)^3 \qquad \text{(Equation 1)}$$

Therefore, it is necessary to achieve an accurate tilt servo for a high density recording of the disk. Also, the optical disk recording/reproducing apparatus must be provided with a tilt detector capable of detecting an accurate tilt amount while recording and reproducing the information.

SUMMARY OF THE INVENTION

The present invention solves the above problems. One purpose of the invention is to provide an optical disk recording/reproducing apparatus capable of detecting an accurate tilt amount while recording and/or reproducing.

To achieve the above object, the present invention provides an optical recording/reproducing apparatus for recording/reproducing information onto/from an optical recording medium, comprising an optical element for condensing a light beam onto the recording medium; and a detector coupled to the optical element for detecting a tilt condition between the recording medium and the optical element, wherein the detector irradiates a detection beam onto the recording medium through the optical element, and detects the detection beam reflected by the recording medium through the optical element. The optical recording/reproducing apparatus includes a driver for driving the optical element in a direction relative to a surface of the recording medium; and a controller for controlling the driver based on the reflected detection beam received by the detector.

According to the invention, a holder holds the optical element. The holder includes a first unit for holding the optical element and a second unit for holding the detector. The optical element has a first optical surface facing the recording medium and a second optical surface facing the detector.

In one embodiment of the invention, the optical element includes an objective lens. In another embodiment of the invention, the detector includes an optical sensor.

According to a preferred embodiment of the present invention, a first axis drawn along a direction of the irradiated detection beam, and a second axis drawn along a direction of the reflected direction beam are such that a plane parallel to the first axis and the second axis is perpendicular to a surface of the recording medium.

According to the present invention, the detector comprises of an emission element for emitting the irradiated detection beam, and a detection element for detecting the reflected detection beam. In the present invention, the emission element and the detection element face a peripheral region of an optical surface of the optical element.

In accordance with another aspect of the invention, a position on the recording medium where the light beam is condensed is a target position for the irradiated detection beam.

According to the invention, an electromagnetic element generates the electromagnetic force to drive the optical element.

In accordance with a further aspect of the invention, a third axis drawn between the emission element and the detection element is parallel to a radial direction of the recording medium.

In accordance with yet another aspect of the invention, the third axis drawn between the emission element and the detection element is perpendicular to a radial direction of the recording medium.

Another embodiment of the invention relates to, an optical recording/reproducing apparatus for recording/reproducing information onto/from an optical recording medium, comprising an optical element for condensing the light beam onto the recording medium; and a detector coupled to the optical element for detecting a tilt condition between the recording medium and the optical element, the detector emitting a detection beam onto a position on the recording medium having a target position of a condensed light beam, and receiving the detection beam reflected by the recording medium.

Other features and advantages of the present invention will become apparent from the following detailed description. It should be understood, however, that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

A more complete appreciation of the present invention and many of its attendant advantages will be readily obtained by reference to the following detailed description considered in connection with the accompanying drawings, in which.

DETAILED DESCRIPTION OF THE PREFERRED EMBODIMENTS

Preferred embodiments of the present invention will be described with reference to the accompanying drawings.

Figure 1:
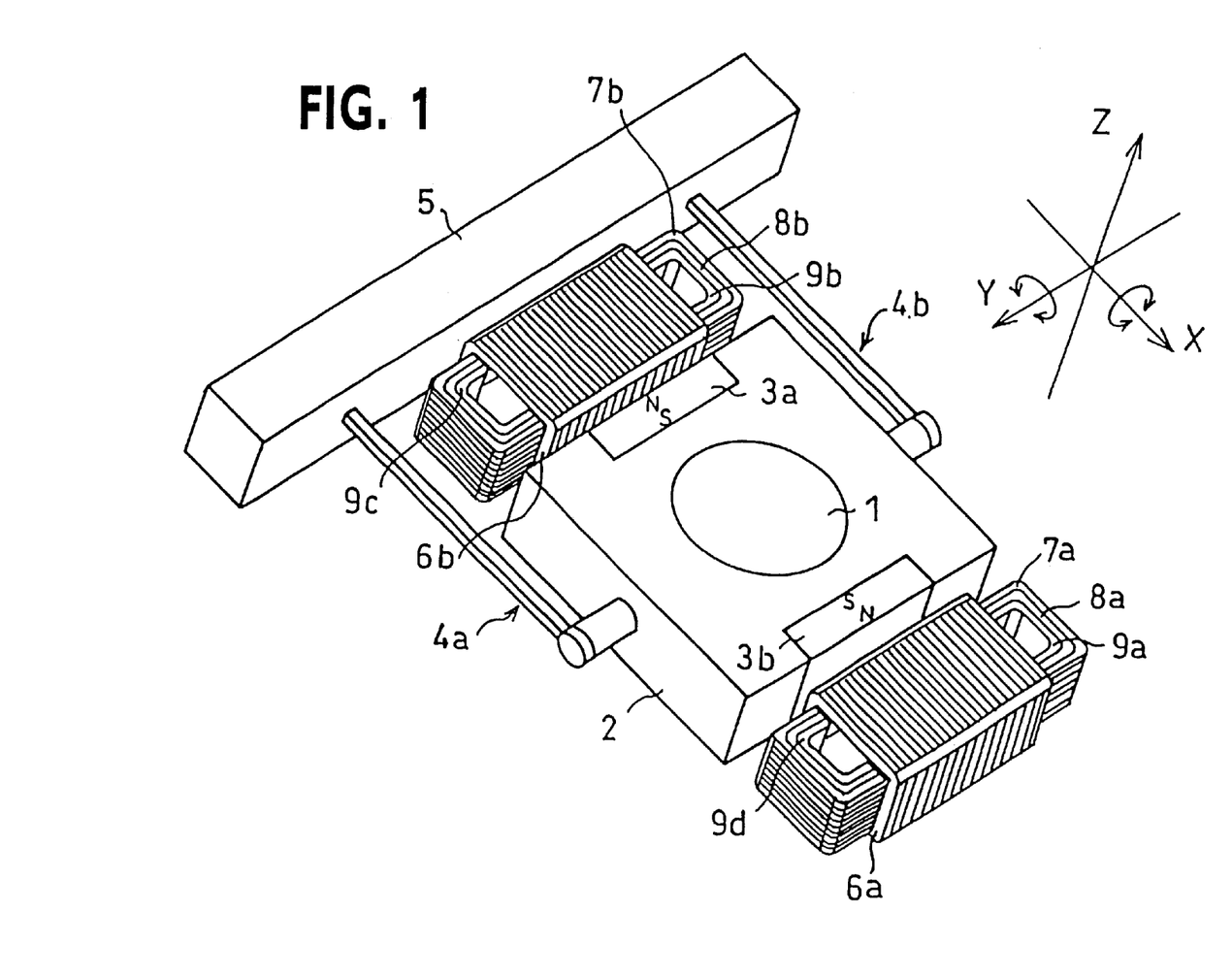
FIG. 1 is a perspective view showing an inner structure of an optical disk recording/reproducing apparatus according to the present invention.

FIG. 1 is a perspective view showing an inner structure of an optical disk recording/reproducing apparatus according to the present invention. An objective lens 1 for irradiating and focusing a laser beam from a light source onto a disk (optical information recording medium such as an optical disk and a DVD) (not shown) is held by an objective lens holder 2. A pair of permanent magnets 3a, 3b are fixed on each side of the objective lens holder 2. On one end of each of the supporting rods 4a, 4b, the objective lens holder 2 is fixed. The other end of each of the supporting rods 4a, 4b is fixed to a stable base portion 5 so as to suspend the objective lens holder 2 with respect to the stable base portion 5. The long portion of the supporting rods 4a, 4b extending from the base 5 is made of BeCu, and the short portion of the supporting rods 4a, 4b extending from the objective lens holder 2 is made of silicone (e.g., modulus of elasticity is approximately 3 MPa). The long portion and the short portion are respectively extended in an X-axis direction and a Y-axis direction, as shown in FIG. 1, and the ratio of the lengths thereof is, for example, 1:5.33 (=8/1.5).

The objective lens holder 2 is capable of securing four degrees of freedom, that is, in the Y-axis direction (tracking direction), Z-axis direction (focusing direction) and around the X-axis (radial tilt direction) and around the Y-axis (tangential tilt direction) by the supporting rods 4a, 4b.

Four types of coils (a total of 10 coils) are disposed at positions opposing the permanent magnets 3a, 3b via gap. These are the tracking coils 6a, 6b, the focusing coils 7a, 7b, the tangential tilt coils 8a, 8b, and the radial tilt coils 9a, 9b, 9c, 9d. Due to the electromagnetic action by exciting current flowing through these coils and magnetic flux generated by the permanent magnets 3a, 3b, the movement of the objective lens holder 2 is controlled at a desired amount in a desired direction.

Figure 9:
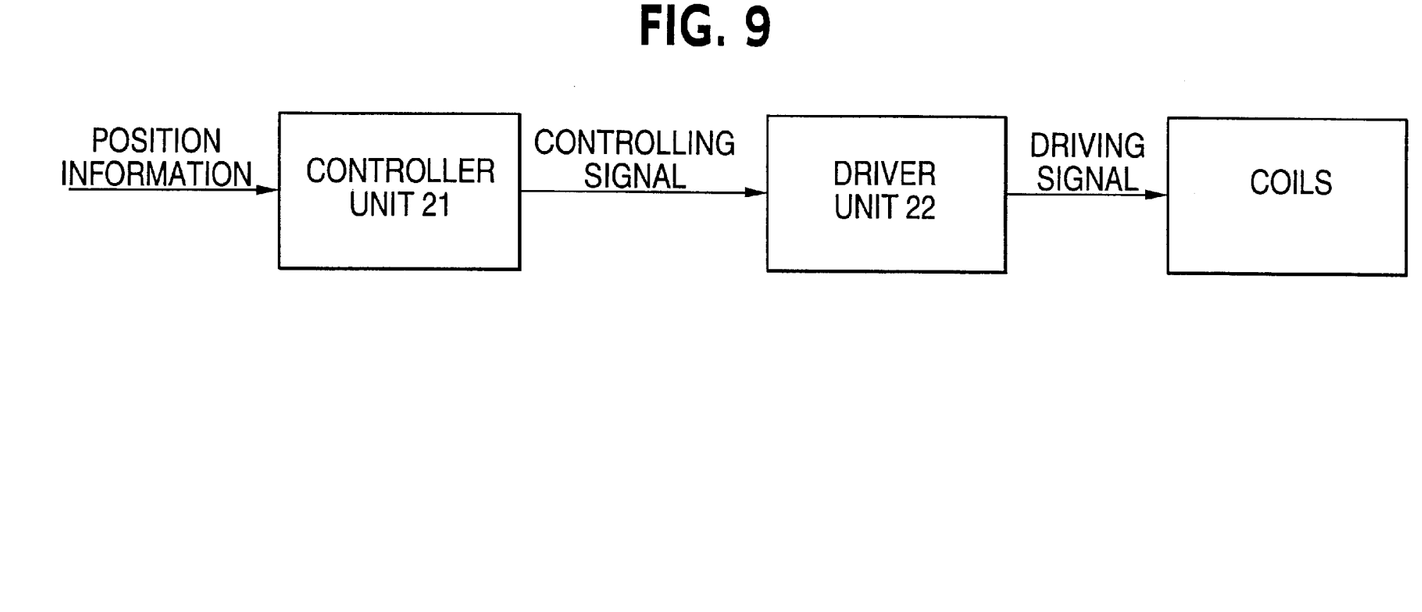
FIG. 9 is a control block diagram for the optical disk recording/reproducing apparatus according to the present invention.

Referring now to FIG. 9, the position information provided by the disk is input to a controller unit 21 (for example a CPU unit of a computer) and a controlling signal obtained from the controller unit 21 is input to a driver unit 22 (for example a D/A converter) so as to calculate a driving signal for the drive control. Such drive control is carried out according to the position information (information of the focusing and tracking directions) generated from signals on the disk. The focusing information direction generates current for the focusing coils 7a, 7b to move the objective lens 1 in the focusing direction. The tracking direction information generates current for the tracking coils 6a, 6b to move the objective lens 1 in the tracking direction. With the position information, the laser beam is radiated and condensed onto a recording information position on the disk, and the recording/reproducing process is done correctly. The drive control is obtained by using a known technique. Details of the objective lens holder and a driving device are provided in application Ser. No. 09/017,481, entitled "Objective Lens Support Device and Objective Lens Driving Device", filed on Feb. 2, 1998, the contents of which are hereby incorporated by reference. The driving signal is provided to the coils shown in FIG. 1.

Generally, for the tilt correction, it is necessary to provide degrees of freedom of the objective lens in the radial tilt direction and the tangential tilt direction. Therefore, by preparing the optical disk recording/reproducing apparatus with the structure described above, it is possible to carry out the tilt correction by moving the objective lens holder 2 in the tangential tilt direction and the radial tilt direction relative to the disk.

Figure 2:
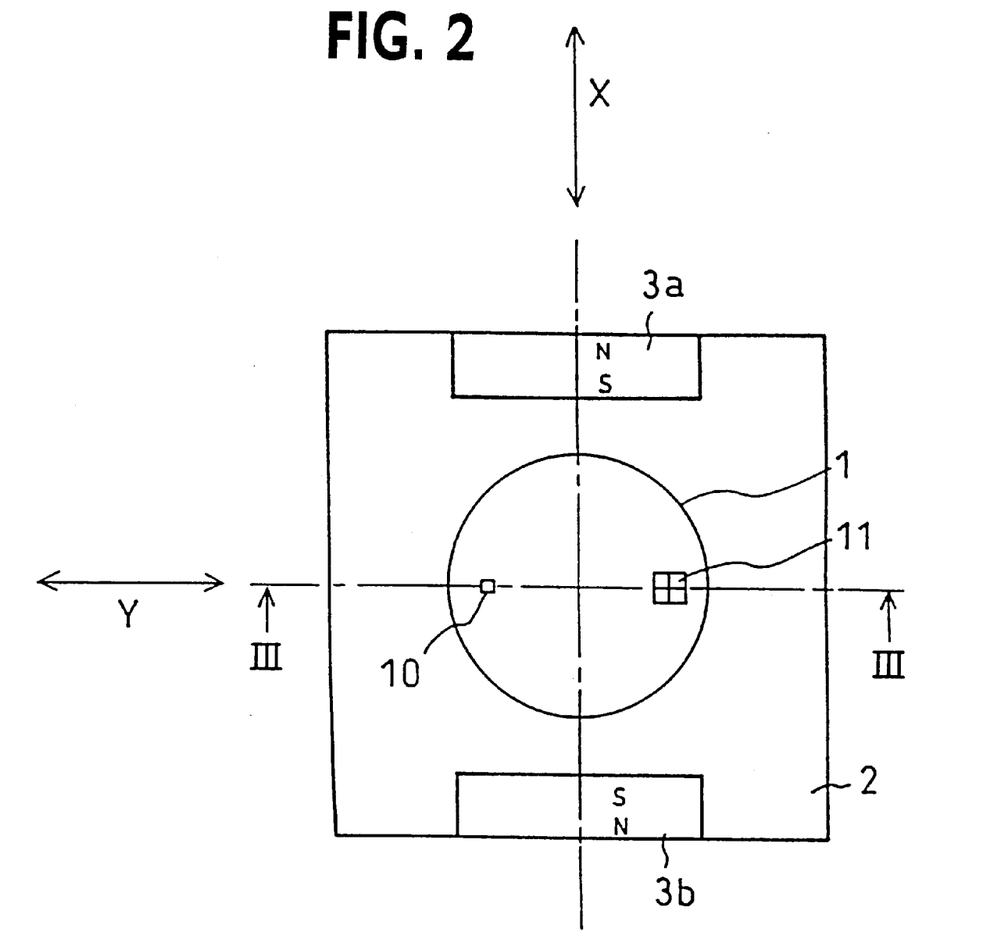
FIG. 2 is a plan view of an objective lens holder which is a part of the optical disk recording/reproducing apparatus.
Figure 3:
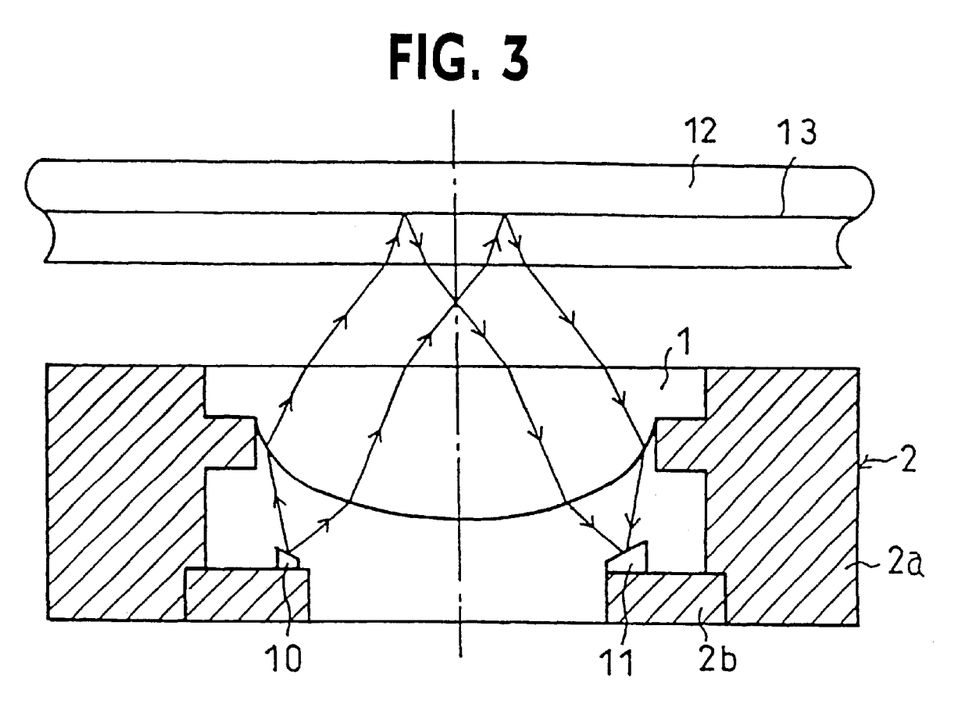
FIG. 3 is a sectional view taken along the lines III—III of FIG. 2.

FIG. 2 is a plan view showing the objective lens holder 2 and FIG. 3 is a sectional view taken along the lines A—A of FIG. 2. As shown in FIGS. 2 and 3, a tilt sensor (tilt detector) comprising a light emission element 10 and a light detection element 11 is disposed below the objective lens 1 of the objective lens holder 2.

As shown in FIG. 2, the tilt sensor is disposed at a position symmetrically relative to a center of the objective lens 1 along the Y-axis. As shown in FIG. 3, the light emission surface of the light emission element 10 and the light detection surface of the light detection element 11 are fixed so as to incline at a predetermined angle relative to an optical axis (dotted and dashed line in FIG. 3).

The light emitted from the light emission element 10 enters the objective lens 1 through a position apart from an optical axis of the objective lens 1, and the light is focused and irradiated onto a reflection layer 13 (a surface in which information is recorded as signals) of the disk 12. The light reflected by the reflection layer 13 returns to the objective lens 1 and is collected by the light detection element 11.

In FIG. 3, a laser beam is guided along the optical axis and is focused on a portion in which the disk 12 and the optical axis intersects, so as to record/reproduce information onto/from the reflection layer 13. On the other hand, the light emitted from the light emission element 10 is also irradiated onto the portion in which the disk 1 and the optical axis intersects.

The light emission element 10 and the light detection element 11 are pre-positioned and fixed on a partial unit 2b. This partial unit 2b is attached to a main unit 2a on which the objective lens 1 is pre-positioned and fixed by adhesion or other means. The main unit 2a and the partial unit 2b constitute the objective lens holder 2.

Assume a plane specified by light paths of emitted light from the light emission element 10 and reflected light from the disk. In a preferred embodiment of the invention, this plane is adjusted so as to be at about a 90° angle relative to the reflection layer 13 of the disk to enable the emitted light from the light emission element 10 to be reflected by the disk and guided to the light detection element 11.

Figure 8:
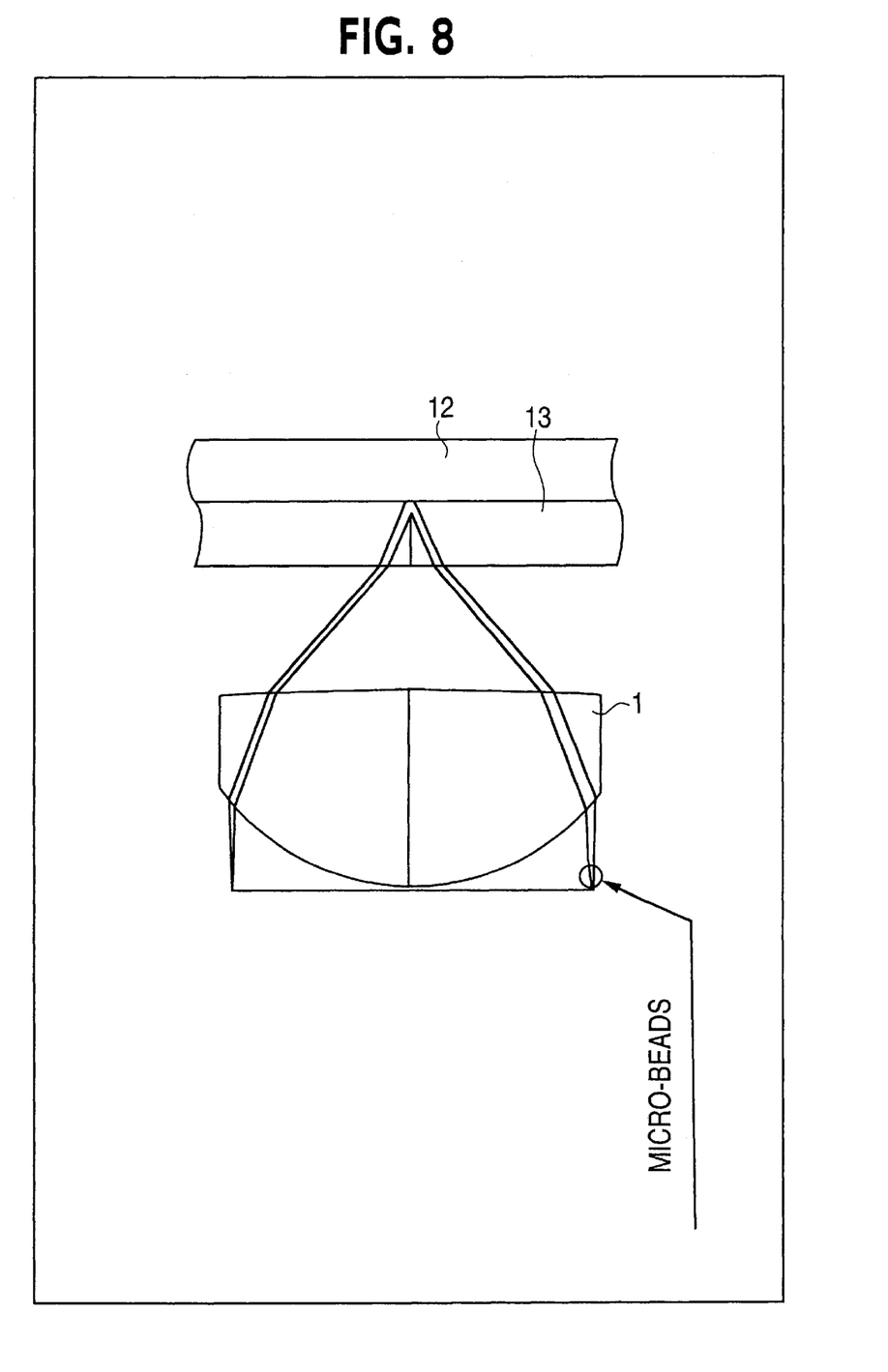
FIG. 8 is a sectional view of the objective lens holder provided with micro-beads.

The diameter of the beam irradiated from the light emission element 10 can be slightly increased in a process in which the beam passes through the objective lens 1 as long as the irradiated light is condensed on the light detection element 11. That is, in the preferred embodiment, a parallel beam passes through the objective lens 1. In another embodiment of the invention, micro-beads or the like are disposed on the light emission surface of the light emission element 10 to reduce the diffusion of the emission light. FIG. 8 is a sectional view which shows the objective lens holder with micro-beads on it. As constructed above, it becomes possible to provide the configuration design of the objective lens 1 with further flexibility, so that the light path can be adjusted easily.

As an example of the light emission element 10, a semiconductor laser having a wavelength of, for example, around 900 nm (preferably 890 nm) can be used. As an example of a light source of laser beam supplied for recording and reproducing of information, a semiconductor laser having a wavelength in a range of about 400 nm–700 nm, (preferably 410 nm, semiconductor blue laser) or (preferably 650 nm, semiconductor red laser)) can be used.

Figure 4:
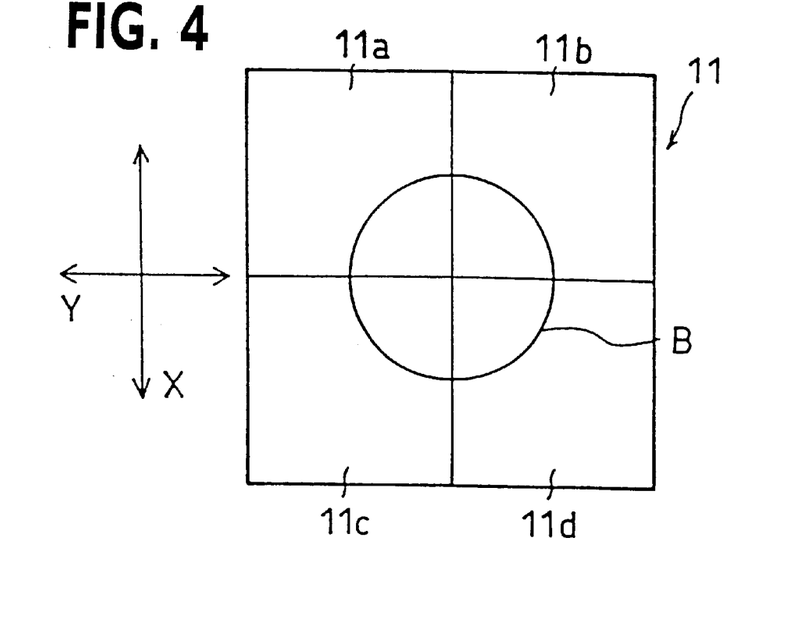
FIG. 4 is a plan view of a light detector.

FIG. 4 is a plan view of the light detection element 11. A beam spot B of reflected light condensed on the light detection element 11 through the objective lens 1 moves on the light detection element 11 along the X-axis direction and the Y-axis direction corresponding to the tangential tilt and the radial tilt at the position where a laser beam spot for recording/reproducing is formed.

The light detection element 11 has four light detection faces 11a, 11b, 11c, 11d. If a tangential tilt occurs in the disk 12, the beam spot B moves along the X-axis direction (the tangential direction) on the light detection element 11. Therefore, the sum of outputs of the light detection faces 11a and 11b is first obtained and the sum of outputs of the light detection faces 11c and lid is next obtained. Then the difference between these sums is obtained. Based on the difference, it is possible to detect how the tilt of the disk 12 in the tangential tilt direction relative to the objective lens 1.

Likewise, if a radial tilt occurs in the disk 12, the beam spot B moves in the Y-axis direction (the tracking direction) on the light detection element 11. Therefore, the sum of outputs of the light detection faces 11a and 11c is first obtained and the sum of the light detection faces 11b and 11d is next obtained. Then a difference between these sums is obtained. Based on the difference, it is possible to detect the tilt of disk 12 in the radial tilt direction relative to the objective lens 1.

Referring back to FIG. 9, the arithmetic operation for obtaining the tangential tilt or the radial tilt is carried out by the controller unit 21. The obtained operation result (driving signal) is calculated by the aforementioned driver unit 22 as a predetermined excitation current is supplied to the tangential tilt coils 8a, 8b and the radial tilt coils 9a, 9b, 9c, 9d based on the driving signal.

Figure 5:
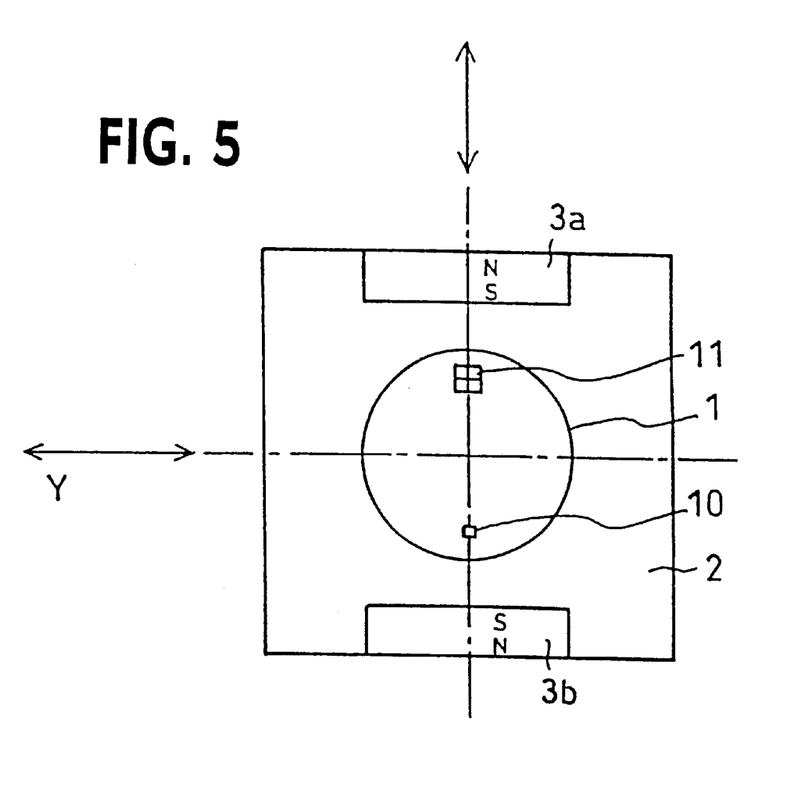
FIG. 5 is a plan view of the light emission element and the light detection element illustrated in FIG. 2 positioned together at 90° around an optical axis.

FIG. 5 shows another embodiment of the present invention in which the light emission element 10 and the light detection element 11 are turned at an angle of 90° relative to the optical axis. Even if the light emission element 10 and the light detection element 11 are disposed on the X-axis, like in this example, the tangential tilt and the radial tilt of the disk 12 can be detected.

Figure 6:
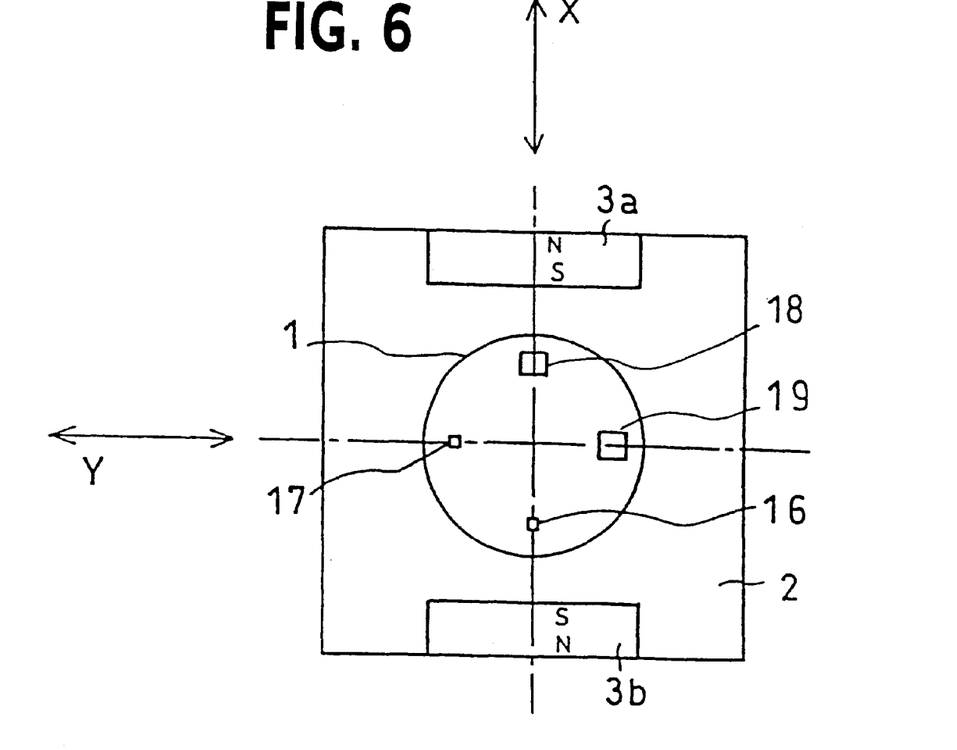
FIG. 6 is a plan view of an example in which two light emission elements and two light detection elements are provided.

FIG. 6 shows yet another embodiment of the present invention in which two light emission elements 16, 17 and two light detection elements 18, 19 are provided. In this embodiment, the tangential tilt of the disk is detected by the light emission element 16 and the light detection element 18, and the radial tilt is detected by the light emission element 17 and the light detection element 19.

Figure 7:
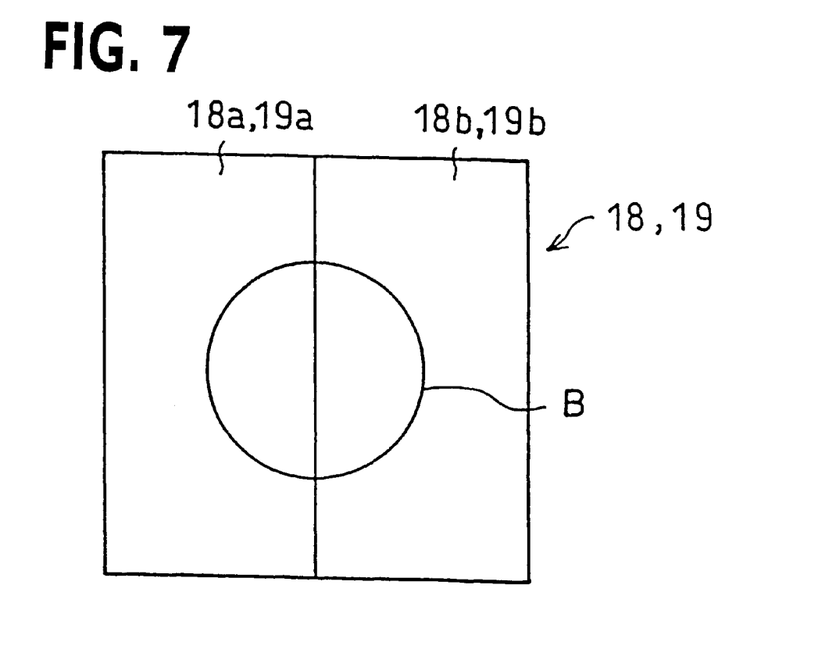
FIG. 7 is a plan view of the light detection element illustrated in FIG. 6.

The light detection element 18 (19) comprises two light detection faces 18a, 18b (19a, 19b) as shown in FIG. 7. If the radial tilt (the tangential tilt) occurs on the disk, the beam spot B moves to the light detection element 18 (19) along a boundary line between the light detection faces 18a (19a) and 18b (19b). Therefore, if the difference between the outputs of the light detection faces 18a (19a) and 18b (19b) is obtained, it is possible to detect how the disk 12 has tilt relative to the objective lens 1 in the tangential tilt direction or the radial tilt direction.

As described above, according to a structure of the present invention, the tilt sensor is mounted on the objective lens holder and the objective lens is used as a part of the light path. Therefore, the tilt amount of a position for recording/reproducing (beam spot position) of the disk can be measured accurately, and also, a relative inclination between the disk and the objective lens can be directly detected.

Thus, the deviation due to the difference between the position of information beam spot and the position of tilt measuring beam spot can be suppressed, and the tilt amount (a relative inclination between the disk and the objective lens) at the time of recording or reproducing can be detected accurately.

Furthermore, it is possible to suppress a phase deviation which is induced because the rotating synchronous component of the tilt varies by a rotation of the disk, and a measuring deviation of the tilt which is induced because a track curvature varies depending on a recording/reproducing position on the disk 12. Accordingly, the tilt amount at the time of recording/reproducing can be detected accurately.

Furthermore, according to the structure of the present invention, a focusing servo for deflection of the disk plane is applied to the objective lens holder in which the tilt sensor is fixed. Therefore, the distance between the disk and the tilt sensor is kept constant. That is, it is possible to know an accurate tilt amount without being affected by the disk plane deflection.

It should be noted that the present invention is not limited to the illustrative embodiments and may be modified into various forms without departing from the spirit and scope of the invention.

For example, the structure with the tangential tilt coils and the radial tilt coils as well as the tracking coil or the focusing coil is described in the above embodiments. However, by controlling the excitation of the tracking coil and the focusing coil, the position control of the objective lens in the tangential tilt direction and the radial tilt direction is carried out.

Although in the above embodiments the objective lens holder is divided into parts 2a, 2b to easily position and fix the light emission element 10 and light detection element 11 relative to the objective lens holder 2, it is possible to position and fix the light emission element 10 and light detection element 11 directly to the objective lens holder 2 without dividing it into any parts.

Furthermore, the present invention can be also applied to an optically integrated actuator loaded with a laser diode, optical parts or the like as well as the objective lens.

As described above, according to the present invention, the optical disk recording/reproducing apparatus detects an accurate tilt amount while recording and/or reproducing.

The contents of the japanese priority Application Number 9-302373 dated Nov. 5, 1997 are hereby incorporated by reference.

What is claimed is:

1. An optical recording/reproducing apparatus for recording/reproducing information onto/from an optical recording medium, comprising:

an optical element for condensing a light beam onto the recording medium; and a detector coupled to and facing the optical element for detecting a tilt condition between the recording medium and the optical element, wherein the detector irradiates a detection beam directly onto the optical element thereby guiding the detection beam onto the recording medium, and detects the detection beam directly from the optical element thereby receiving the detection beam reflected by the recording medium.

2. The optical recording/reproducing apparatus according to claim 1, further comprising:

a driver for driving the optical element in a direction relative to a surface of the recording medium; and a controller for controlling the driver based on the reflected detection beam received by the detector.

3. The optical recording/reproducing apparatus according to claim 1, wherein the optical element includes an objective lens.

4. The optical recording/reproducing apparatus according to claim 1, wherein a first axis drawn along a direction of the irradiated detection beam, and a second axis drawn along a direction of the reflected detection beam are such that a plane parallel to the first axis and the second axis is perpendicular to a surface of the recording medium.

5. The optical recording/reproducing apparatus according to claim 1, wherein the detector comprises of an emission element for emitting the irradiated detection beam, and a detection element for detecting the reflected detection beam.

6. The optical recording/reproducing apparatus according to claim 5, wherein the emission element and the detection element face a peripheral region of an optical surface of the optical element.

7. The optical recording/reproducing apparatus according to claim 1, wherein a position on the recording medium where the light beam is condensed is a target position for the irradiated detection beam.

8. The optical recording/reproducing apparatus according to claim 5, wherein the detector includes an optical sensor.

9. The optical recording/reproducing apparatus according to claim 1, further comprising:

an electromagnetic element for generating an electromagnetic force to drive the optical element.

10. The optical recording/reproducing apparatus according to claim 9, wherein the electromagnetic element includes a coil.

11. The optical recording/reproducing apparatus according to claim 9, wherein the electromagnetic element includes a magnet.

12. The optical recording/reproducing apparatus according to claim 5, wherein a third axis drawn between the emission element and the detection element is parallel to a radial direction of the recording medium.

13. The optical recording/reproducing apparatus according to claim 5, wherein a third axis drawn between the emission element and the detection element is perpendicular to a radial direction of the recording medium.

14. The optical recording/reproducing apparatus according to claim 5, further comprising an optical bead for reducing diffusion of the irradiated detection beam.

15. The optical recording/reproducing apparatus according to claim 1, further comprising a holder for holding the optical element.

16. The optical recording/reproducing apparatus according to claim 15, wherein the holder includes a first unit for holding the optical element and a second unit for holding the detector.

17. The optical recording/reproducing apparatus according to claim 1, wherein the optical element has a first optical surface facing the recording medium and a second optical surface facing the detector.

18. An optical recording/reproducing apparatus for recording/reproducing information onto/from an optical recording medium, comprising:

an optical element for condensing a light beam onto the recording medium; and a detector coupled to and facing the optical element for detecting a tilt condition between the recording medium and the optical element, the detector emitting a detection beam directly onto the optical element thereby guiding the detection beam onto a position on the recording medium having a target position of the condensed light beam, and receiving the detection beam directly reflected by the recording medium.

19. The optical recording/reproducing apparatus according to claim 18, further comprising:

a driver for driving the optical element in a direction relative to a surface of the recording medium; and a controller for controlling the driver based on the reflected detection beam received by the detector.

20. The optical recording/reproducing apparatus according to claim 18, wherein the optical element includes an objective lens.

21. The optical recording/reproducing apparatus according to claim 18, wherein a first axis drawn along a direction of the irradiated detection beam, and a second axis drawn along a direction of the reflected direction beam are such that a plane parallel to the first axis and the second axis is perpendicular to a surface of the recording medium.

22. The optical recording/reproducing apparatus according to claim 18, wherein the detector comprises of an emission element for emitting the irradiated detection beam, and a detection element for detecting the reflected detection beam.

23. The optical recording/reproducing apparatus according to claim 22, wherein the emission element and the detection element face a peripheral region of an optical surface of the optical element.

24. The optical recording/reproducing apparatus according to claim 22, wherein the detector includes an optical sensor.

25. The optical recording/reproducing apparatus according to claim 18, further comprising:

an electromagnetic element for generating an electromagnetic force to drive the optical element.

26. The optical recording/reproducing apparatus according to claim 25, wherein the electromagnetic element includes a coil.

27. The optical recording/reproducing apparatus according to claim 25, wherein the electromagnetic element includes a magnet.

28. The optical recording/reproducing apparatus according to claim 25, wherein a third axis drawn between the emission element and the detection element is parallel to a radial direction of the recording medium.

29. The optical recording/reproducing apparatus according to claim 25, wherein a third axis drawn between the emission element and the detection element is perpendicular to a radial direction of the recording medium.

30. The optical recording/reproducing apparatus according to claim 25, further comprising an optical bead for reducing diffusion of the irradiated detection beam.

31. The optical recording/reproducing apparatus according to claim 18, further comprising a holder for holding the optical element.

32. The optical recording/reproducing apparatus according to claim 31, wherein the holder includes a first unit for holding the optical element and a second unit for holding the detector.

33. The optical recording/reproducing apparatus according to claim 18, wherein the optical element has a first optical surface facing the recording medium and a second optical surface facing the detector.

* * * * *